(12) United States Patent
Kamamori (10) Patent No.: US 10,365,770 B2
(45) Date of Patent: Jul. 30, 2019

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Yuki Kamamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/709,239

(22) Filed: Sep. 19, 2017

(65) Prior Publication Data

US 2018/0081495 A1 Mar. 22, 2018

(30) Foreign Application Priority Data

Sep. 21, 2016 (JP) .................................. 2016-183795

(51) Int. Cl.
  *G06F 3/042* (2006.01)
(52) U.S. Cl.
  CPC .. *G06F 3/0425* (2013.01); *G06F 2203/04101* (2013.01)
(58) Field of Classification Search
  CPC ...... G01S 17/026; G01S 7/4808; G06F 3/017; G06F 3/0425; G06F 3/0426
  See application file for complete search history.

(56) References Cited

U.S. PATENT DOCUMENTS

2013/0285985 A1* 10/2013 Pinter ................... G06F 3/0421
                                                          345/175
2016/0188028 A1*  6/2016 Ono ........................ G06F 3/042
                                                          345/175

FOREIGN PATENT DOCUMENTS

JP        2014-163833 A       9/2014

* cited by examiner

*Primary Examiner* — Gerald Johnson
(74) *Attorney, Agent, or Firm* — Canon U.S.A., Inc. IP Division

(57) ABSTRACT

An information processing apparatus according to embodiments of the present invention includes an input obtaining unit configured to repeatedly obtain an input image that is obtained through imaging by an imaging unit oriented in a direction intersecting with a predetermined surface, the input image having pixels each representing a distance along the direction, an identifying unit configured to identify, in the obtained input image, an object area where an object that is present between the predetermined surface and the imaging unit is imaged, and a correcting unit configured to correct a distance represented by each pixel in the input image repeatedly obtained by the input obtaining unit, by using a correction value obtained based on a difference between a distance represented by a pixel of a portion of the input image excluding the object area and reference distance between the imaging unit and the predetermined surface.

18 Claims, 8 Drawing Sheets

INFORMATION PROCESSING APPARATUS, METHOD FOR CONTROLLING THE SAME, AND STORAGE MEDIUM

BACKGROUND OF THE INVENTION

Field of the Invention

The present invention relates to a technique for correcting an error of a range image observed by a range image sensor.

Description of the Related Art

In recent years, a gesture operation, in particular touching, is sometimes performed on a user interface (UI) projected on an arbitrary target surface, such as a desk or a wall, or an object placed on a desk. In such a case, an operation is recognized in the following manner using, for example, a range image sensor of a time of flight (TOF) method: a target surface is captured using an imaging unit for a range image, from which information on a distance to the subject can be obtained, and a hand or an object that is present between the imaging unit and the target surface is detected. Specifically, a three-dimensional position of a fingertip is derived based on coordinates of the fingertip of a hand detected in the range image and a distance corresponding to the coordinates, and an operation is recognized based on the position and a path of the fingertip.

Accuracy of the distance information included in the range image tends to vary due to installation environment of the sensor and temperature, and thus an error varies over time. An error may vary in a range of several tens of millimeters during a gesture operation taking several tens of seconds. Thus, the distance information included in the range image has to be automatically corrected for high accurate detection of a three-dimensional position of a fingertip.

Japanese Patent Application Laid-Open No. 2014-163833 discusses correction of a range image by canceling an error between a measurement distance of an area assumed in advance that no object is present in a placement surface in the range image and a predetermined reference distance.

SUMMARY OF THE INVENTION

Embodiments of the present invention are directed to improvement of accuracy of processing for detecting an object that is present at an arbitrary position in a range image based on the range image in which a distance error varies over time with a tendency that the distance error differs from area to area.

According to embodiments of the present invention, an information processing apparatus includes an input obtaining unit configured to repeatedly obtain an input image that is obtained by imaging by an imaging unit oriented in a direction intersecting with a predetermined surface, the input image having pixels each representing a distance along the direction, an identifying unit configured to identify, in the input image obtained by the input obtaining unit, an object area where an object that is present between the predetermined surface and the imaging unit is imaged, and a correcting unit configured to correct a distance represented by each pixel in the input image repeatedly obtained by the input obtaining unit, by using a correction value obtained based on a difference between a distance represented by a pixel of a portion of the input image excluding the object area and a reference distance between the imaging unit and the predetermined surface.

Further features of the present invention will become apparent from the following description of exemplary embodiments with reference to the attached drawings.

DESCRIPTION OF THE EMBODIMENTS

Hereinafter, information processing according to an exemplary embodiment of the present invention is described in detail with reference to the drawings. Note that a configuration described in the exemplary embodiment is an example, and the scope of the present invention is not intended to be limited to the configuration.

Generally, a "touch" is an action of starting a touch input on an object or an item projected on a surface of the object by bringing a fingertip into contact with or near the surface or a display area of the item projected on the surface. A "release" is an action of terminating a touch input on the object or the item by moving the fingertip that has been into contact with or near the object or the item away from the object or the item after the touch. Many information processing apparatuses supporting a "touch" can recognize various touch operations, such as a "tap", a "move", and a "flick", based on a position, movement, speed, and the like of the fingertip from a "touch" to a "release". For example, an input by an operation including a "touch" on the target surface by a fingertip and then a "release" without movement of the fingertip along the target surface is referred to as a "tap" and is usually recognized as an instruction for selecting the touched object. The present exemplary embodiment will be described using an example in which an information processing apparatus that recognizes a tap operation as an input for selecting a user interface (UI) and gives feedback to an operator each time a tap operation is recognized.

Most of portable devices, such as smartphones and tablet personal computers (PC), can directly detect contact of a fingertip of an operator with a display screen by a touch sensor provided on the display screen and recognize a touch input. On the other hand, a range image sensor (also referred to as a depth sensor) is typically used to measure a position of a fingertip and a distance between the fingertip and the target surface when a touch input on a surface on an arbitrary object without a touch sensor is detected. Transition from a state where the distance is larger than a predetermined distance to a state where the distance is smaller than the predetermined distance is recognized as a "touch", a transition from a state where the distance is smaller than a predetermined distance to a state where the distance is larger than the predetermined distance is recognized as "release". The range image is an image that has pixels each having a value representing information corresponding to a distance from a reference position (e.g., a lens center of an imaging unit) to a surface imaged in the pixel along the depth direction of the image. As a typical imaging unit of a range image, a range image sensor of time of flight (TOF) method is known. The range image sensor of the TOF method measures a distance using a time difference (phase difference) from time when laser light is emitted from the sensor to time when the laser light reflected by the imaging target object returns to the sensor. However, in range image sensors including range image sensors of the TOF method, distance measurement accuracy tends to vary due to installation environment and temperature. Specifically, an error may vary in a range of several tens of millimeters during a gesture operation taking several tens of seconds. In such a situation, it is difficult to detect a three-dimensional position of a fingertip and contact of the fingertip with an operation surface with high accuracy. As a result, selection by a tap operation may not be recognized, or selection may be recognized at a position different from a position intended by an operator.

Errors of areas (pixels) in a range image may vary over time with tendencies different for the respective areas (pixels), and thus there may be a case where an appropriate distance cannot be obtained even if the entire range image is uniformly corrected. Meanwhile, appropriate correction for each area is needed even when a position of a hand or an object in a range image cannot be predicted in advance during, for example, a gesture operation.

Therefore, in the present exemplary embodiment, a distance error different in each pixel of a range image in which a target surface and a hand are captured is corrected according to degrees of variations of the error over time. Specifically, a correction value image is derived based on a difference between a range image obtained by imaging the target surface and a reference image expected to be obtained when the target surface is imaged, and distance error of each pixel in the range image is corrected using the correction value image. In particular, when a hand is present between the imaging unit and the target surface during execution of a gesture, a correction value image is derived based on differences in pixels excluding the hand area.

Hereinafter, a first exemplary embodiment will be described using, for example, a case where an operator selects a UI projected and displayed on a table of a tabletop interface (IF) system by a touch input by a fingertip of one hand, and the tabletop interface system changes contents projected and displayed according to the selected UI. In the present exemplary embodiment, a touch input to be used is a tap operation, and an operation is recognized by a range image sensor mounted on a tabletop IF system. The imaging unit is a range image sensor, the target surface is a table of the tabletop IF system, and the object that is present between the imaging unit and the target surface is an operator's hand. In the following description, an operation is performed by an operator's hand. However, the present exemplary embodiment can also be applied to cases where an operation is performed by an object, such as a stylus or a robot arm. The present exemplary embodiment can also be applied to cases where an object other than a hand is placed on the table as the object that is present between the imaging unit and the target surface. The present exemplary embodiment can be applicable not only to the tabletop IF system but also to a system obtained by replacing the table with an upright screen, a white board or the like.

[System Appearance]

Figure 1:
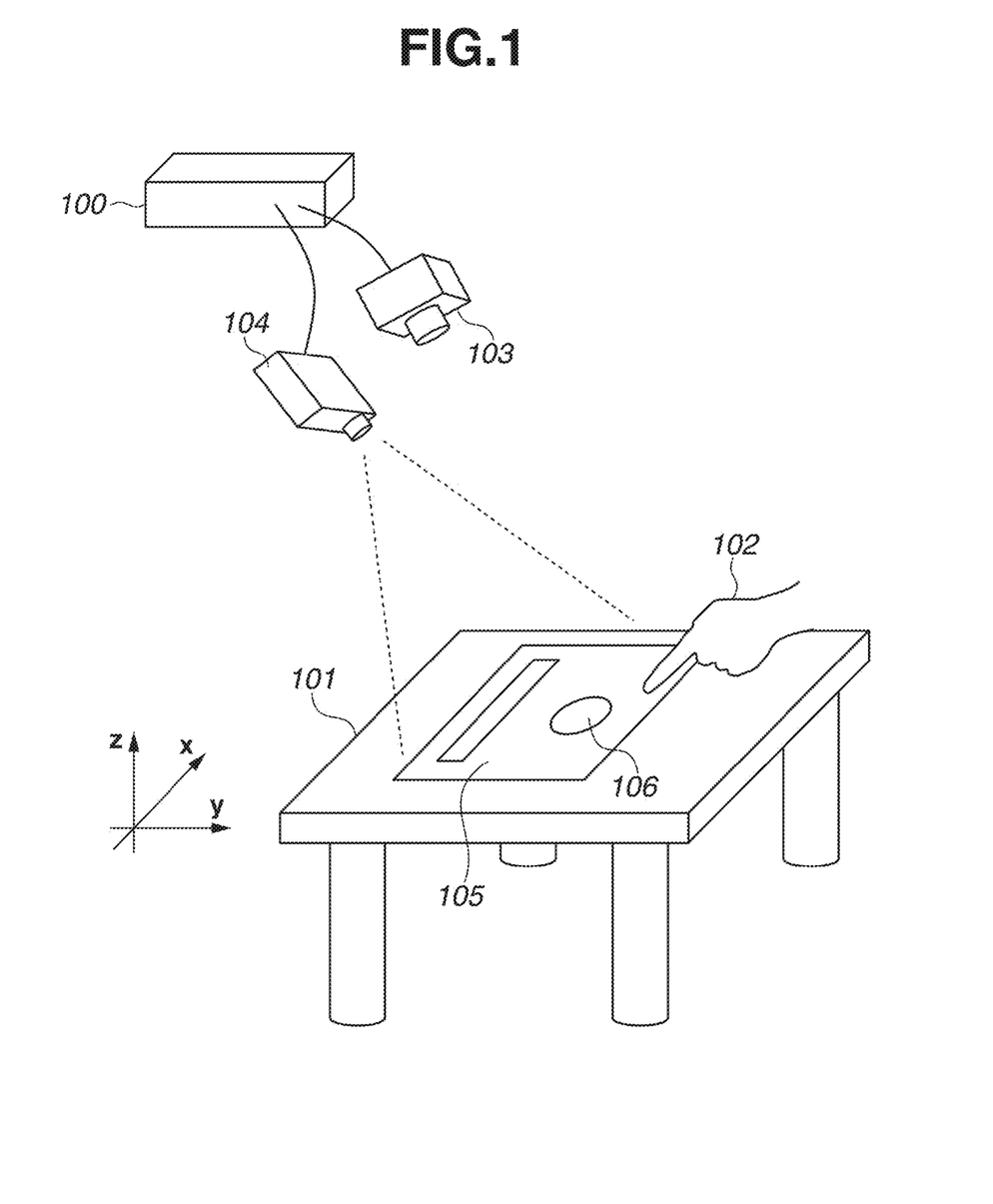
FIG. 1 illustrates an example of appearance of a system using an information processing apparatus according to a first exemplary embodiment.

FIG. 1 illustrates an example of appearance of a tabletop IF system in which an information processing apparatus 100 according to the present exemplary embodiment is installed. FIG. 1 also illustrates coordinate axes of the world coordinate system that defines position information in a three-dimensional space. A target surface 101 is a table portion of the tabletop IF system, and an operator can perform a tap operation by touching the target surface 101 with a fingertip of a hand 102 and releasing the touch. In the present exemplary embodiment, a range image sensor 103 is installed above the target surface 101 to look down the target surface 101. Therefore, in a captured range image, the depth direction intersects with the target surface 101. That is, the depth direction of the captured range image is related to a distance (height) from the target surface 101, and this information is used for recognition of a tap operation. The information processing apparatus 100 detects the hand 102 of the operator that is present in a space over the target surface 101 by extracting an area that is the foreground from the target surface 101 in the range image. The information processing apparatus 100 also obtains coordinates and a distance corresponding to the fingertip in the range image by analyzing a hand area corresponding to the hand 102, and derives a position of the fingertip in the world coordinate system on the basis of the obtained coordinates and distance. In the present exemplary embodiment, a sensor of the TOF method is used as the range image sensor 103. It is not necessary to use a sensor of the TOF method, but a sensor capable of obtaining a range image, for example, an infrared light sensor of a pattern light projection method or a stereo camera, can be substituted. A projector 104 projects and displays a display image 105 on the target surface 101. The display image 105 is, for example, a UI image representing a graphical user interface (GUI), and includes one or more items as UI parts. In this system, an operator performs a tap operation on an item 106 included in the projected display image 105. In addition, the projector 104 can project the display image 105 of various contents and the item 106 of various colors as visual feedback for the tap operation.

The range image sensor 103 is not necessarily installed above the target surface 101 as long as an image of the target surface 101 seen from above can be obtained. For example, when the range image sensor 103 is configured to capture an image of a mirror installed above the target surface 101, an image having a viewing angle for looking the target surface 101 from above can be obtained. Similarly, the projector 104 projecting on the target surface 101 as looking down the target surface 101 from obliquely above in the example of FIG. 1 may be configured to project in a different direction, and the projected light may be reflected to the target surface 101 by using a mirror and the like.

In addition, for the purpose of detecting the hand area, a visible light sensor or an infrared sensor may be installed above the target surface 101. Detection accuracy of the hand area may be improved by extracting and using a flesh color area in the visible light image captured by the visible light sensor. However, when flesh color extraction is performed, it is desirable that color tone and a light amount of the display image 105 projected and displayed by the projector 104 be limited. In addition, hand area detection by extracting flesh color is also possible without being affected by the projection light, by synchronizing a projection cycle of the projector 104 and an imaging cycle of the visible light sensor and switching between projection and imaging at a high speed at a level that cannot be visually identified by an operator. Further, based on an infrared image captured by the infrared sensor, pixels having significantly different brightness from brightness at the time of imaging the target surface 101 can be detected as a hand area.

[Apparatus Configuration]

Figure 2A:
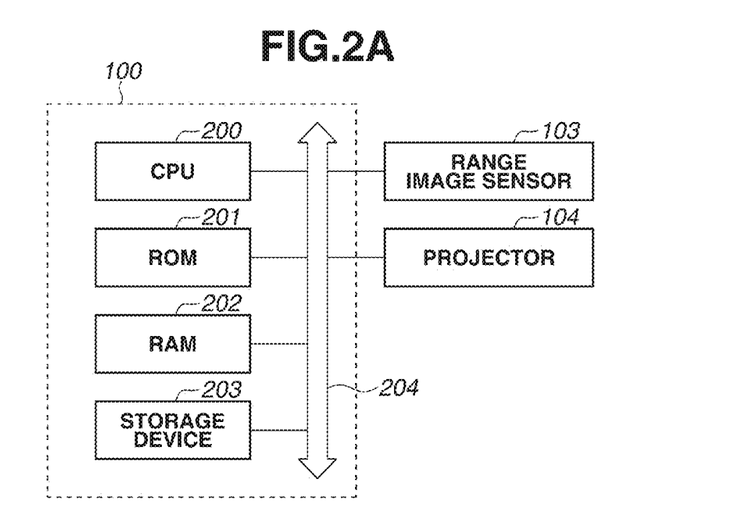
FIG. 2A illustrates a hardware configuration of the information processing apparatus according to the first exemplary embodiment.

FIG. 2A is a hardware configuration diagram of the tabletop IF system including the information processing apparatus 100 according to the present exemplary embodiment. A central processing unit (CPU) 200 executes an operating system (OS) and a program stored in a read only memory (ROM) 201 and a storage device 203 using a random access memory (RAM) 202 as a work memory to perform operation for various types of processing and logical determination. The CPU 200 thus controls each of the components connected to a system bus 204. Types of processing performed by the CPU 200 include correction processing of a range image and recognition processing of a touch input to be described below. The storage device 203 may be a hard disk drive or an external storage device connected through various interfaces, and stores programs and various types of data related to correction processing and recognition processing according to the exemplary embodiment. Under the control of the CPU 200, the range image sensor 103 captures a range image of a space including the target surface 101 and the hand 102 of an operator on the target surface 101, and outputs the captured range image to the system bus 204. In the present exemplary embodiment, a method for obtaining a range image is described based on a method using infrared light that is less affected by ambient light or projection display on the target surface 101, but a parallax method or the like may be used depending on application. Under the control of the CPU 200, the projector 104 projects and displays the display image 105 including the item 106 to be operated and feedback on a tap operation on the target surface 101.

In a usage example of FIG. 1, the range image sensor 103 and the projector 104 are external devices connected to the information processing apparatus 100 through an input/output interface, and are included in an information processing system cooperating with the information processing apparatus 100. However, these devices may be integrated with the information processing apparatus 100.

Figure 2B:
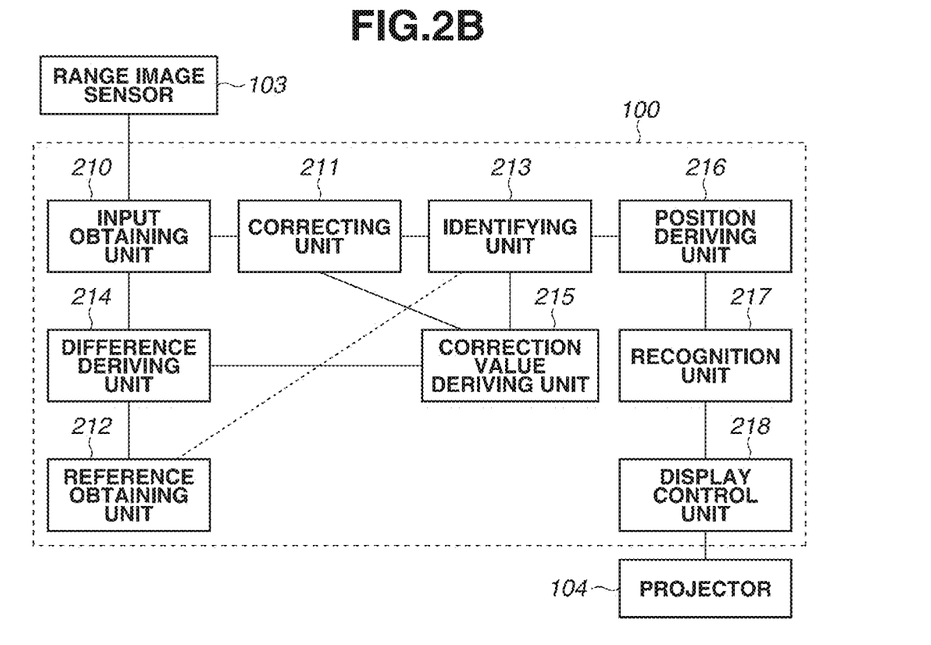
FIG. 2B is a block diagram illustrating an example of a functional configuration of the first exemplary embodiment.

FIG. 2B is a block diagram illustrating an example of a functional configuration of the information processing apparatus 100 according to the present exemplary embodiment. Each functional unit is implemented in such a manner that the CPU 200 loads a program stored in the ROM 201 into the RAM 202 and executes processing according to each procedure of flowcharts to be described below. Alternatively, for example, in a case where hardware is configured as an alternative to the software processing using the CPU 200, a computation unit and a circuit corresponding to the processing of each functional unit described herein may be included.

An input obtaining unit 210 obtains a range image captured by the range image sensor 103 as an input image at regular time intervals, and stores the input image in the RAM 202 at all times. The obtained input image corresponds to each frame image of live video. An object that is obtained by the input obtaining unit 210 and exchanged with each functional unit is actually a signal corresponding to image data. However, in this specification, this processing is merely described such as "the input obtaining unit 210 obtains a range image" or "the input obtaining unit 210 obtains an input image".

A correcting unit 211 corrects a distance held by each pixel of an input image obtained by the input obtaining unit 210 as a pixel value, based on a correction value image. The correction value image is an image having pixels corresponding to respective pixels of the input image, and each pixel holds a value for correcting a distance held by the corresponding pixel in the input image. Processing for deriving the correction value image is described below. Hereinafter, a range image corrected using a correction value image may be referred to as a "corrected input image".

A reference obtaining unit 212 obtains a reference image that is predetermined based on a positional relationship between the imaging unit and the target surface. The reference image defines a reference distance between the imaging unit and the target surface. In the present exemplary embodiment, the reference image is an image having pixels corresponding to respective pixels of the input image, and each of the pixel holds a value that is expected to be obtained when the target surface is imaged in an ideal situation where no measurement error by the range image sensor 103 occurs. Each pixel value of the reference image can be previously calculated based on, for example, a lens characteristic of the range image sensor and translation/rotation movement parameter with respect to the world coordinate system, and further based on information on which of flat surfaces in the world coordinate system matches the table. Alternatively, it is also possible to generate a reference image by giving each pixel an actually measured distance between the range image sensor and the table. In the present exemplary example, the reference obtaining unit 212 reads a range image which is generated at the time when the positional relationship between the range image sensor 103 and the target surface 101 has been fixed and is stored in the storage device 203, and stores the range image in the RAM 202.

An identifying unit 213 identifies a hand area in the input range image. The hand area is an area in which the hand 102 of an operator appears in the range image. In the present exemplary embodiment, differences between corresponding pixels of the corrected input image and the reference image are calculated, and based on magnitude of the differences, a group of pixels considered to be distant from the target surface by a predetermined distance or more (present on the foreground side) is identified as a hand area. The reason of identifying the hand area from the corrected input image is that the correction reduces influence of a measurement error in a distance value held by each pixel, and the boundary of the hand area can be determined more accurately. In a system where an object other than a hand may be used for an operation and be present between the range image sensor 103 that is an imaging unit and the target surface 101, the identifying unit 213 identifies an area where a hand and the object are imaged as an object area.

A difference deriving unit 214 performs processing for calculating a difference between corresponding pixels of the input image and the reference image and derives a difference image that holds the obtained difference values as pixel values of the corresponding pixels. So far as pixels of the input image in which only the target surface is captured (pixels that are not in the object area), distance information obtained from the input image and distance information obtained from the reference image ideally match and a difference between the pieces of distance information is ideally zero. However, when they do not match, the difference can be considered to be an error caused by sensor installation environment, temperature, and the like. The present exemplary embodiment derives a correction value image that cancels the difference between the range image and the reference image and corrects the range image. The difference corresponds to the error.

A correction value deriving unit 215 derives a correction value image. The correction value image is an image having pixels corresponding to respective pixels of the input image, and each pixel of the correction value image holds a value for correcting a distance represented by the corresponding pixel in the input image. In the present exemplary embodiment, a correction value image derived based on an input image obtained in a cycle by the input obtaining unit 210 is used for correcting an input image to be obtained in a subsequent cycle. That is, except for an input image obtained in the first frame after activation of the information processing apparatus 100, when an input image is obtained, a correction value image derived based on an input image of a preceding frame is already stored in the RAM 202. For the input image obtained initially after activation of the information processing apparatus 100, a correction value image prepared as an initial image is used. When a hand area is identified in a corrected input image of a current frame, the correction value deriving unit 215 integrates a portion corresponding to a difference image into a portion, of the correction value image already stored in the RAM 202, corresponding to an area (pixels) excluding the identified hand area. The correction value deriving unit 215 then approximates distance values distributed in the correction value image to an arbitrary flat surface to avoid discontinuity of pixel values in the correction value image or occurrence of a defective area in which no pixel value is present. The input image of the current frame herein means the last obtained input image.

A position deriving unit 216 detects image coordinates, in the hand area identified in the input image, of a position satisfying a predetermined condition as an input position. In the present exemplary embodiment, a fingertip portion of the hand 102 of the operator is identified. Accordingly, contour points of the hand area are extracted, and a contour point of which curvature is determined to be most likely a fingertip is detected as the input position. However, the method for detecting the input position is not limited to this. For example, a position of a pixel in the hand area where a distance from an intersection point of the end portion of the range image and the hand area is the longest may be detected as a position that is most likely a fingertip in the hand area and may be used as the input position. Such substitution may sometimes simplify calculations that are necessary for detection processing. In addition, the position deriving unit 216 converts coordinates of the input position detected in the image coordinates and a distance value held by a pixel or a group of pixels corresponding to the input position, to derive world coordinates of the input position. In the present exemplary embodiment, by using a lens characteristic of the range image sensor and the translation/rotation movement parameter with respect to the world coordinate system, the input position defined by the coordinate system and the distance value in the range image is converted to world coordinates. In a case where an object to be used for the operation is not a hand but a stylus, for example, a predetermined portion such as an end portion of the object area is similarly detected as an input position, and the position is obtained after conversion to world coordinates.

A recognition unit 217 recognizes a tap operation on the target surface by the fingertip based on a path of the input position in the world coordinates. In the present exemplary embodiment, a tap operation is recognized based at least on a fact that a time elapsed from when the fingertip approaches the target surface within a predetermined distance from the target surface to when the fingertip is away from the target surface is a predetermined value or less and a fact that an amount of movement of the fingertip in a direction parallel to the target surface is a predetermined value or less.

Using information stored in the ROM 201 and the storage device 203, a display control unit 218 generates, modifies, and outputs the display image 105 to be projected and displayed on the target surface 101 by the projector 104. In the present exemplary embodiment, when a tap operation is recognized at a predetermined position (for example, within a display area of the item 106), contents of the display image 105 is changed and displayed.

[Description of Recognition Processing of Touch Input]

Figure 3:
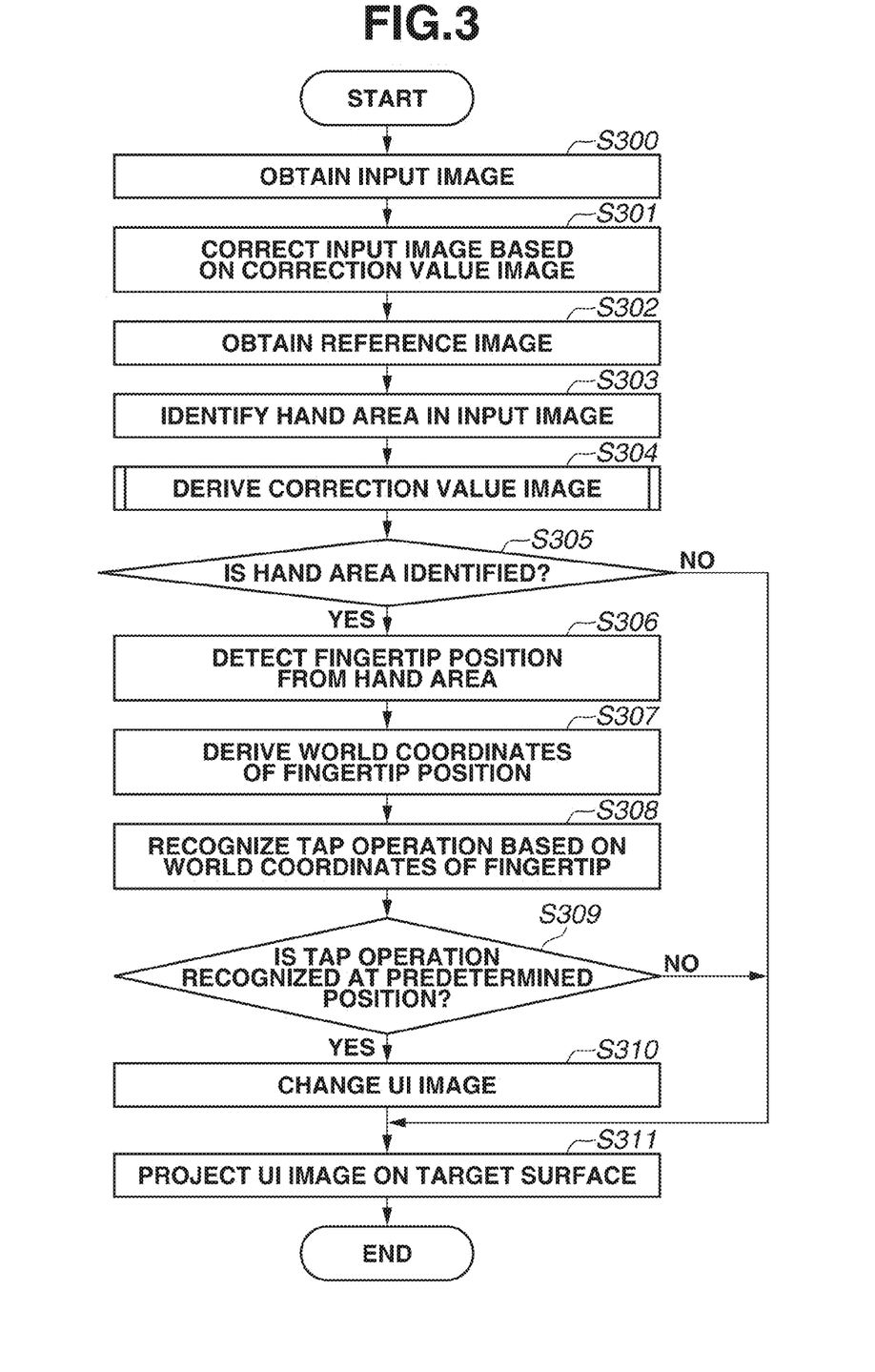
FIG. 3 is a flowchart illustrating an example of procedure of a touch input recognition processing according to the first exemplary embodiment.
Figure 5:
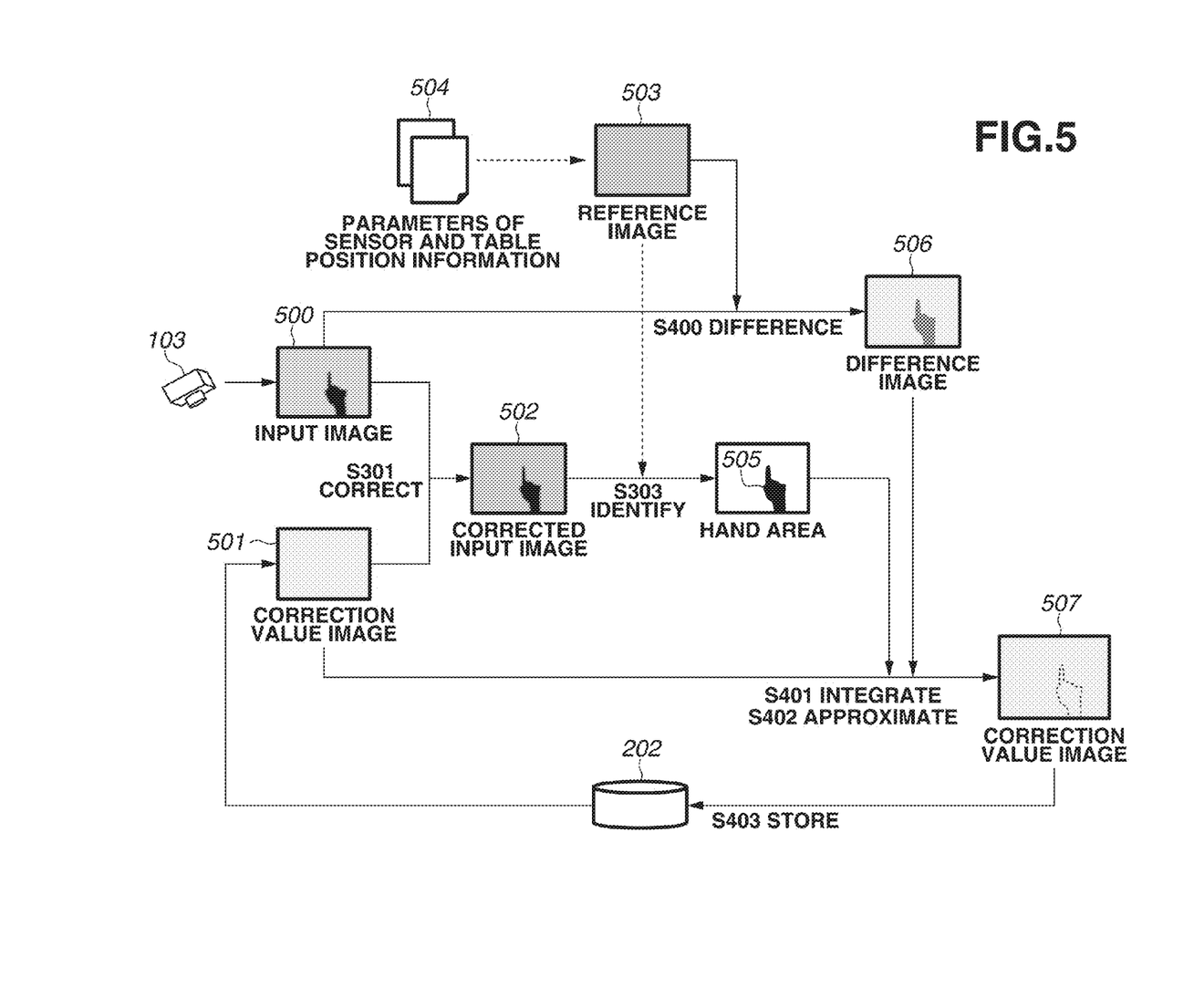
FIG. 5 illustrates an example of a process of correcting processing of a range image and derivation processing of the correction value image according to the first exemplary embodiment.

According to a flowchart of FIG. 3, a flow of recognition processing of a touch input executed in the first exemplary embodiment is described. Here, a description will be given using the following example: an operation of an application that changes contents of the display image 105 in response to the item 106 in the display image 105 projected and displayed on the target surface 101 by the projector 104 being selected by a tap operation of an operator. Hereinafter, the processing of flowchart illustrated in FIG. 3 may be referred to as "touch input recognition processing". The processing of the flowchart of FIG. 3 is implemented by the CPU 200 including functional units of the information processing apparatus. The CPU 200 implements the processing by loading a program stored in the ROM 201 into the RAM 202 and executing the program. In the present exemplary embodiment, the processing of the flowchart illustrated in FIG. 3 is started in response to input of a range image captured by the range image sensor 103 to the information processing apparatus 100. In the present exemplary embodiment, the processing of the flowchart illustrated in FIG. 3 is repeated every time when a range image is input from the range image sensor 103. Therefore, the cycle for repeating the processing matches the frame rate of the video captured by the range image sensor 103. In the following description, FIG. 5 is appropriately referred. FIG. 5 illustrates a whole process of correction processing of a range image and derivation processing of a correction value image according to the first exemplary embodiment.

In step S300, the input obtaining unit 210 obtains, as an input image 500, a range image captured by imaging a space including at least a portion of the target surface 101 (table) on which the display image 105 is projected, by the range image sensor 103. When an operator performs an operation, the input image 500 includes the hand 102 of the operator that is present between the target surface 101 and the range image sensor 103. In step S301, the correcting unit 211 corrects a distance held by each pixel of the input image 500 obtained by the input obtaining unit 210, based on a correction value image 501 stored in the RAM 202 to obtain a corrected input image 502. In the present exemplary embodiment, correction is performed by adding, to a value of each pixel of the correction value image 501, a value of a corresponding pixel of the input image 500. The method of correction is not limited to this, and it is also possible to correct the error by a method involving, for example, multiplication/division or subtraction. A method for deriving the correction value image is described below in S304. The correction value image stored in the RAM 202 when the processing of step S301 is performed is an image derived based on the input image 500 of a preceding frame or an initial image prepared as an initial state.

In step S302, the reference obtaining unit 212 obtains a reference image 503 defining a reference distance between the imaging unit and the target surface. In the present exemplary embodiment, the reference image 503 is previously stored. The reference image 503 has pixels each having a pixel value calculated based on information 504 regarding a lens characteristic of the range image sensor, and translation/rotation movement parameter with respect to the world coordinate system, and further based on information on which of flat surfaces in the world coordinate system matches the table position information. The reference image 503 is generated, for example, when the information processing apparatus 100 is installed and the positional relationship between the target surface 101 and the range image sensor 103 is fixed.

In step S303, the identifying unit 213 identifies a hand area 505 in the corrected input image 500. In the present exemplary embodiment, a difference between the corrected input image 502 and the reference image 503 is obtained for each pixel, and a group of pixels having differences equal to a threshold value or more is identified as the hand area 505. This corresponds to extracting, as the hand area 505, an area in the foreground from the target surface represented by the reference image 503. Here, by setting a value larger than the noise width of the range image and smaller than thickness of the operator's hand or the finger as the threshold value, it is possible to identify the hand area 505 with little noise and defect. The method for identifying the hand area 505 is not limited to this, and it is also possible to identify the hand area 505 using a background difference method, for example. In such a case, a range image obtained at time when the hand is not present between the target surface and the range image sensor 103 is previously stored as a background image, and a difference from the input image 500 obtained thereafter and the background image is calculated for each pixel. As a result, an area which is in the foreground from the background image and is in the corrected input image 502, can be identified as the hand area 505. As an alternative example, an imaging unit of a visible light image (visible light image sensor) is installed separately, and then the hand area 505 is detected by extracting a flesh color area in the visible light image captured by the visible light image sensor. Depending on environment, detection accuracy of the hand area 505 may be improved by using a visible light image. As yet another alternative example, an imaging unit of an infrared image (infrared image sensor) is installed separately, and then pixels having significantly different brightness from brightness corresponding to the target surface 101 in the infrared image captured by the infrared image sensor is detected as the hand area 505. For a system in which an object other than a hand can be present between the imaging unit and the target surface, an object area in which the object is imaged is identified similarly to the case of identification of the hand area 505, and is used for calculation processing of a correction value image 501 to be described below.

In step S304, the difference deriving unit 214 and the correction value deriving unit 215 derive the correction value image 501. The correction value image 501 derived here is used in the correction processing (corresponding to step S301) in touch input recognition processing of a subsequent frame. The derivation processing of the correction value image 501 is described below.

In step S305, the identifying unit 213 determines whether the hand area 505 is identified. In a case where the hand area 505 is identified (YES in step S305), the processing proceeds to step S306. In a case where the hand area 505 is not identified (NO in step S305), the processing proceeds to step S311. In step S306, the position deriving unit 216 detects, as the input position, a position corresponding to the fingertip from the identified hand area 505 in the corrected input image 502. In the present exemplary embodiment, contour points of the hand area 505 are extracted, and a contour point of which curvature is determined to be most likely a fingertip is detected as the input position. In step S307, the position deriving unit 216 derives the position of the fingertip in the world coordinate system, based on image coordinates of the input position detected in the range image and a distance value held in a corresponding pixel (or pixel group). In the present exemplary embodiment, by using a lens characteristic of the range image sensor and the translation/rotation movement parameter with respect to the world coordinate system, the input position in the range image is converted to world coordinates. The position deriving unit 216 accumulates the world coordinates of the derived input positions for a predetermined number of frames in the RAM 202.

In step S308, the recognition unit 217 refers to information on the input positions accumulated in the RAM 202, and recognizes an operation input to the information processing apparatus 100, based on a path of the input positions. In the present exemplary embodiment, a tap operation on the target surface 101 by the fingertip of the operator is recognized based at least on variation in a distance between the input position and the target surface 101. A tap operation is recognized based at least on a fact that a time elapsed from when the fingertip approaches the target surface to within a predetermined distance from the target surface to when the fingertip is away from the target surface is a predetermined value or less and a fact that an amount of movement of the fingertip in a direction parallel to the target surface is a predetermined value or less.

In step S309, the recognition unit 217 determines whether a tap operation is recognized in a predetermined area (an area where the item 106 is displayed in the display image 105). In a case where a tap operation is recognized (YES in step S309), the processing proceeds to step S310. In a case where a tap operation is not recognized (NO in step S309), the processing proceeds to step S311. In step S310, the display control unit 218 changes contents of the display image 105 in response to recognition of the tap operation within the predetermined area. In the present exemplary embodiment, the display control unit 218 changes a color of an image included in the display image 105. In step S311, the display control unit 218 projects and displays the display image 105 on the target surface 101 by the projector 104. The tap operation is an example, and the information processing apparatus 100 can recognize various gesture operations according to presetting. Many gesture operations including the tap operation as described above can be recognized based on transition of a state of the hand area 505 or a path of the input positions accumulated in a series of sequential input images rather than the single input image 500.

[Description of Derivation Processing of Correction Value Image]

Figure 4:
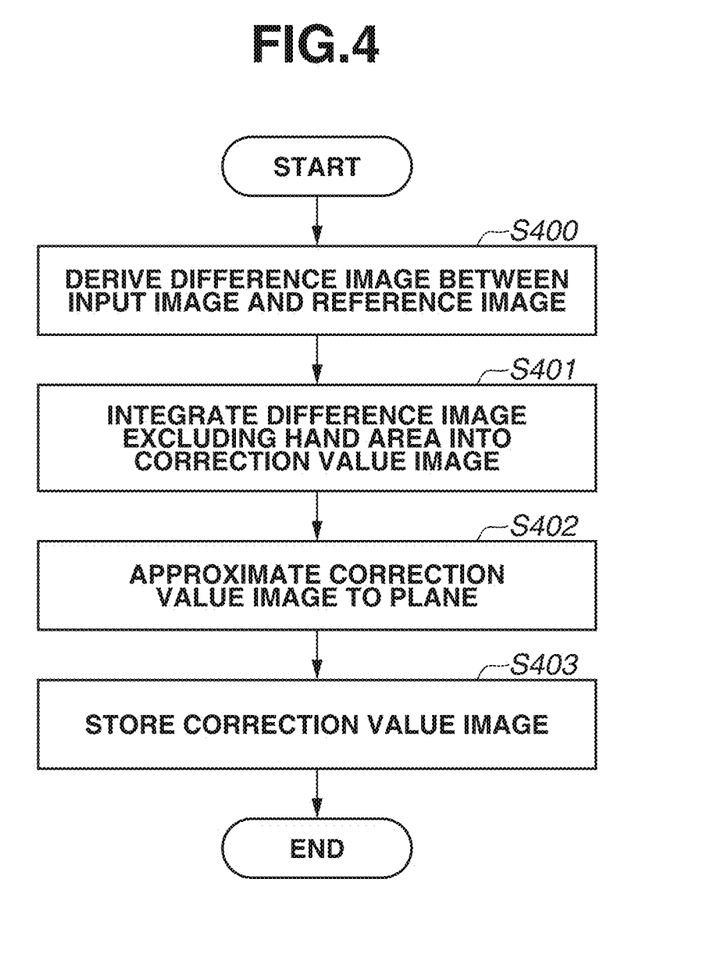
FIG. 4 is a flowchart illustrating an example of a flow of derivation processing of a correction value image according to the first exemplary embodiment.

Here, the derivation processing of the correction value image in step S304 is described. FIG. 4 is a flow chart illustrating a flow of the derivation processing of the correction value image executed in the first exemplary embodiment. The processing of the flowchart illustrated in FIG. 4 is started in response to performance of the hand area identifying processing in the range image in step S303.

In step S400, the difference deriving unit 214 derives a difference value between the input image 500 obtained in step S300 and the reference image 503 obtained in step S302 for each pixel. Then, the difference deriving unit 214 obtains a difference image 506 which holds the derived difference values as pixel values of the corresponding pixels. So far as pixels in which the target surface (table) is imaged in the range image, a difference value for each pixel is a distance measurement error for each pixel at the time of imaging, and the difference value is desirably zero. Therefore, in the present exemplary embodiment, the pixel values of the difference image 506 that are values capable of canceling the distance measurement errors in the input image 500 are used as pixel values of a new correction value image 507. However, when a hand is present between the imaging unit and the target surface, that is, when the hand area 505 is included in the input image 500, difference values of pixels in the hand area 505 do not correspond to distance measurement errors and thus are not suitable for pixel values of the correction value image 507.

Therefore, in step S401, the correction value deriving unit 215 integrates an area (pixels) excluding an area corresponding to the hand area 505 identified in step S303 in the difference image 506 into a corresponding portion of the correction value image 507. In the present exemplary embodiment, overwriting pixel values of the correction value image 501 with corresponding pixel values of the difference image 506 is regarded as integration. However, a method of integration is not limited to this. For example, by setting weighted sum of pixel values of the difference image 506 and pixel values of the original correction value image 501 as new correction values, it is possible to suppress extreme variation in correction values due to sudden noise. In step S303, the hand area 505 in the corrected input image 500 is identified. In the present exemplary embodiment, the pixels included in the input image 500, the corrected input image 502, the reference image 503, the correction value image 501, and the difference image 506 all have correspondence relationship to one another. Accordingly, image coordinates (coordinates indicated in a two-dimensional coordinate system defined in an image) defining the hand area 505 identified in the corrected input image 502 are also used as an area affected by presence of a hand when deriving the difference image 506 and the correction value image 507.

As described above, in the present exemplary embodiment, for pixels corresponding to the hand area 505 of the correction value image 507, the correction values derived based on the latest input image 500 are not integrated in step S401. However, only through the processing, if the operator's hand is approximately stationary on the table and there is no variation in the position of the hand area 505 in the range image for a while, correction values in the area are not updated for a while even though magnitude of errors varies over time. Therefore, in the present exemplary embodiment, in step S402, the correction value deriving unit 215 approximates the correction value image 507 to a flat surface to assign new correction values derived based on the input image 500 also to pixel values of a portion corresponding to the hand area 505. Thus, it is possible to solve the issue that the correction values are not updated for the pixels corresponding to the hand area 505 even though magnitude of the distance measurement errors varies over time. A target to which the correction value image 507 is approximated is not limited to a flat surface but may be approximated to an arbitrary surface. For example, when a spatial characteristic of the distance measurement errors is known theoretically or empirically, a more effective correction value image 507 can be derived by approximating the correction value image 507 to an arbitrary curved surface or the like. In addition, by interpolating correction values of the pixels corresponding to the hand area 505 from correction values of pixels near the hand area 505, deterioration of correction values outside the hand area 505 caused by the flat surface approximation can be suppressed. Updating of the corrected image by such approximation/interpolation is particularly effective when errors in pixels of the range image are spatially continuous (the difference between errors of adjacent pixels is small).

In step S403, the correcting unit 211 stores the newly derived correction value image 507 in the RAM 202. The stored correction value image 507 is used for the correction processing of step S301 in the touch input recognition processing of a subsequent frame. When variation in errors in each pixel of the distance image over time is continuous (difference between errors in frames is small), it is possible to appropriately correct the errors using the correction value image derived in the immediately preceding frame. In the present exemplary embodiment, in step S301, the range image is corrected based on the correction value image read from the RAM 202. For the first frame, no correction value image has been derived based on an input image of a preceding frame. In the present exemplary embodiment, for the first frame, a range image that is known not to include a hand area is obtained prior to start of touch input recognition processing, and a difference image between the range image and the reference image is stored in the RAM 202 as an initial correction value image. This makes it possible to appropriately correct the range image from the first frame of the touch input recognition processing.

The touch input recognition processing and the correction value image derivation processing performed in the present exemplary embodiment has been described. In the above-described example, the input image is corrected based on the correction value image already stored in the RAM 202 in step S301. However, processing of re-correcting the input image on the basis of a correction value image derived in step S304 may be added after step S304. In an environment where an error greatly varies overtime, this may enable highly effective correction in which a distance measurement error is further canceled comparing to a case where a correction value image derived one frame before is used. In addition, in the above-described example, the correction value image is integrated into the area excluding the hand area in step S401. However, in a system in which an object other than the operator's hand may be present on the target surface, the processing can be performed in a similar manner of a case handling an area in which the object is imaged. That is, by identifying the hand area and the object area in the range image in step S303, and integrating the portion of the difference image excluding the hand area and the object area into the correction value image in step S401, the correction value image can be correctly derived even when an object is present.

As described above, in the present exemplary embodiment, a distance measurement error, in the range image, occurring in real time is corrected using a difference between range images, which are repeatedly captured to represent a distance from the imaging unit to the target surface, and a predetermined reference distance between the target surface and the imaging unit. In particular, during a gesture operation, a hand is present between the imaging unit and the target surface. Thus, the hand area is excluded from the distance information which is used for deriving correction values, and the distance measurement error occurring in the hand area portion is then corrected. Accordingly, even during a gesture operation, highly reliable correction is possible for a distance measurement error that varies in real time.

<Variation>

Next, as a variation of the first exemplary embodiment, the following example will be described: in the derivation processing of the correction value image, additional processing is provided in order to suppress erroneous calculation of correction values near a boundary of an area where an object exists. In the first exemplary embodiment, the input image and the reference image are used, and difference values the pixels corresponding to a portion, of an input image, where the target surface rather than an object such as a hand is imaged is considered to correspond to a distance measurement error occurring in the input image. This is a method assuming environment that allows accurate identification of an area where an object is captured in the input image, and distance measurement errors in the input image are entirely uniform without being affected by presence of the object. However, due to installation environment of an apparatus, characteristics of an object used for an operation, and the like, defect and extreme variation in measurement errors may occur near the boundary between the hand area and the portion where the target surface is imaged. For example, when a portion of the identified object area is defective, the defective portion may be considered to be a portion where the target surface is imaged. In that case, correction values for the portion become extremely large, which may impede accurate operation recognition. Distance measurement values near the object area tend to temporarily have extremely large errors due to the influence of infrared light irradiated from the range image sensor 103 being reflected on the object, for example. Accordingly, correction values near the hand area also temporarily vary extremely, and there are cases where correction values derived using the preceding frame cannot correct errors sufficiently.

To solve the above-described problem that is likely to occur near an area where the object is present, in the present variation, an area which is not suitable for deriving correction values is identified in the input image and distance information in the area is not used for correction. Specifically, a mask image that masks an area unsuitable for derivation of correction values is derived, and pixels corresponding to an area that is not masked by the mask image in a difference image between an input image and a reference image are used for correction. An area unsuitable for derivation of the correction values is an area that is considered to be an area where distance measurement values to the target surface 101 as a reference are not obtained. In the present variation, it is considered that the identified object area is highly possibly defective near pixels having small differences between pixel values of the corrected input image and the reference image (distance difference). Therefore, a mask image is derived in consideration of a distance difference of each pixel between the corrected input image and the reference image. By newly generating a mask image, it is possible to suppress deterioration of correction accuracy by the correction value image when there is a defect in the identified object area or when there is a lot of noise near the object area.

Hereinafter, an example, similar to the first exemplary embodiment, will be described using an example case where an operator selects a UI projected and displayed on a table of a tabletop IF system by a touch input by a fingertip of one hand, and the tabletop interface system changes contents projected and displayed according to the selected UI. Also in the variation, the subject of the operation is not limited to a hand of an operator. In addition, the target surface is not limited to a table.

[Apparatus Configuration]

Appearance of the tabletop IF system and a configuration of an apparatus according to the variation are similar to those of the first exemplary embodiment illustrated in FIGS. 1 and 2. Therefore, a detailed description of common elements is not provided.

Figure 6:
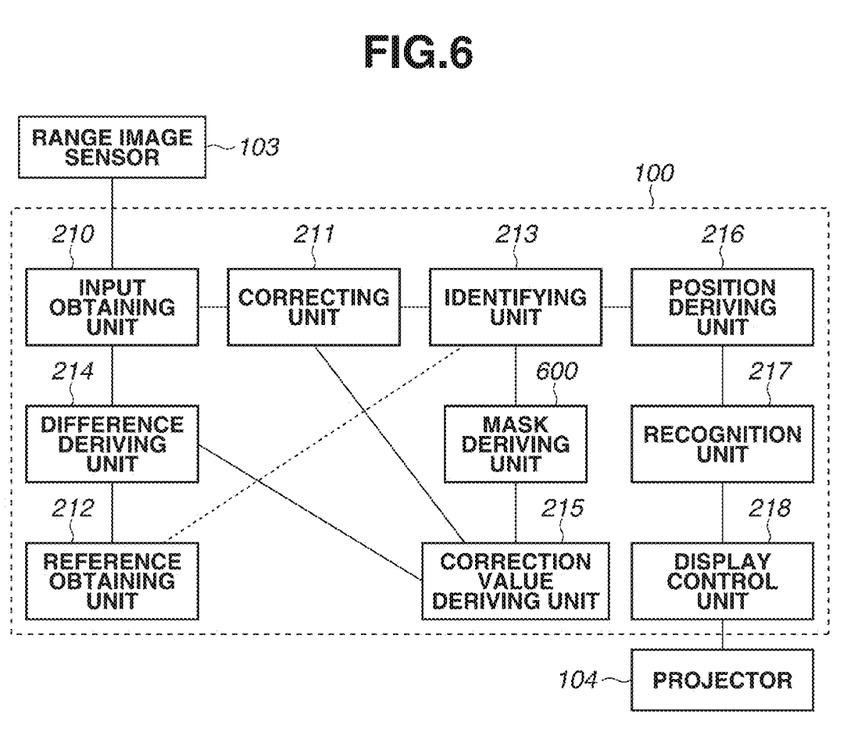
FIG. 6 is a block diagram illustrating an example of a functional configuration according to a variation.

FIG. 6 is a block diagram illustrating an example of a functional configuration of an information processing apparatus 100 in the variation. Each of the functional units are implemented by the CPU 200 in such a manner that the CPU 200 loads a program stored in the ROM 201 into the RAM 202 and executes processing according to flowcharts similar to those of the first exemplary embodiment. However, hardware may be used as an alternative. The functional units having functions similar to those of the first exemplary embodiment illustrated in FIG. 2B are denoted by the same numbers and detailed description thereof is not provided. Here, points that are different from the first exemplary embodiment are described.

A mask deriving unit 600 derives a mask image, based on a hand area in a range image identified by the identifying unit 213. The derived mask image is used by the correction value deriving unit 215 to integrate a difference image and correction value image performed.

[Description of Derivation Processing of Correction Value Image]

Figure 7:
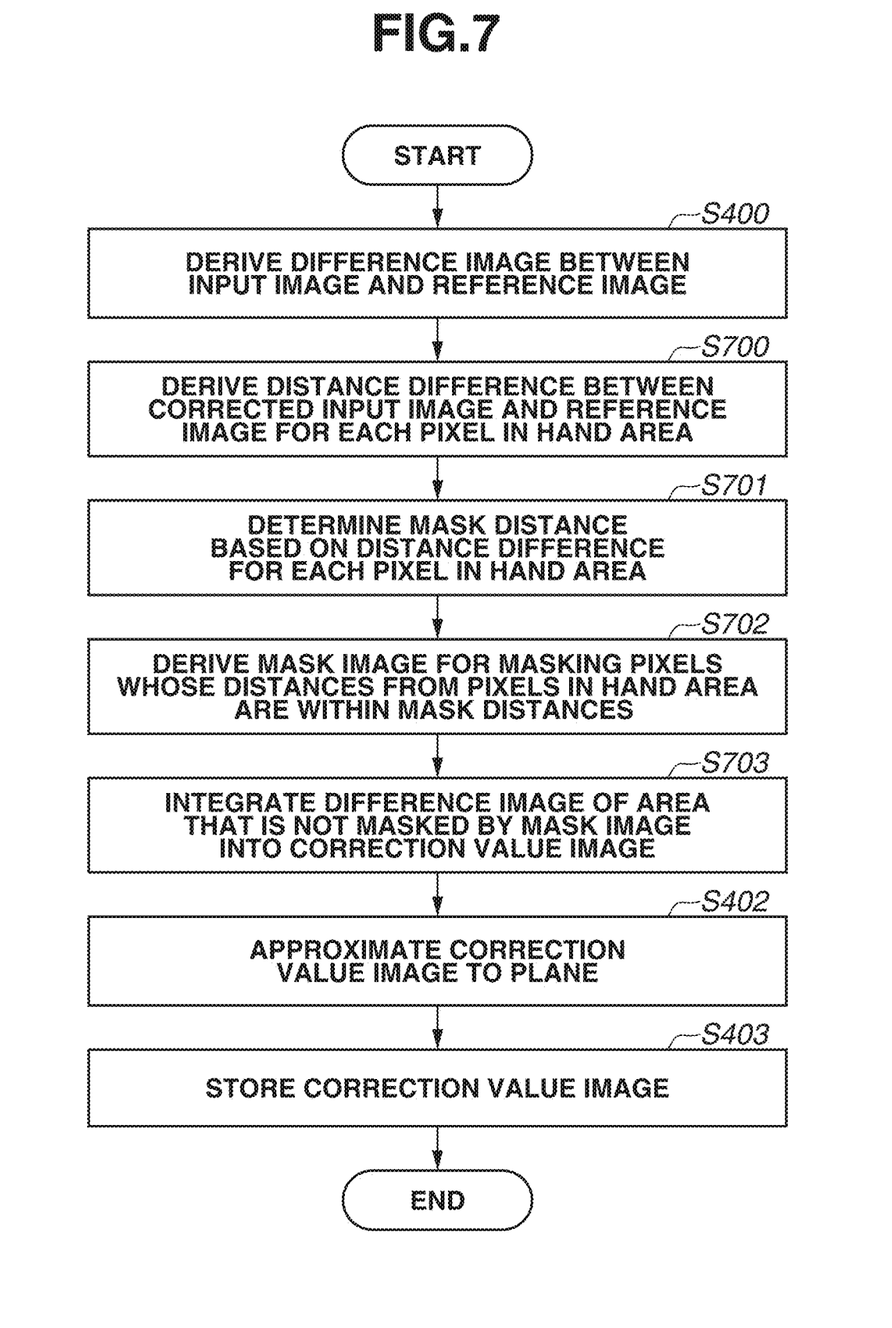
FIG. 7 is a flowchart illustrating an example of procedure of derivation processing of a correction value image according to the variation.
Figure 8:
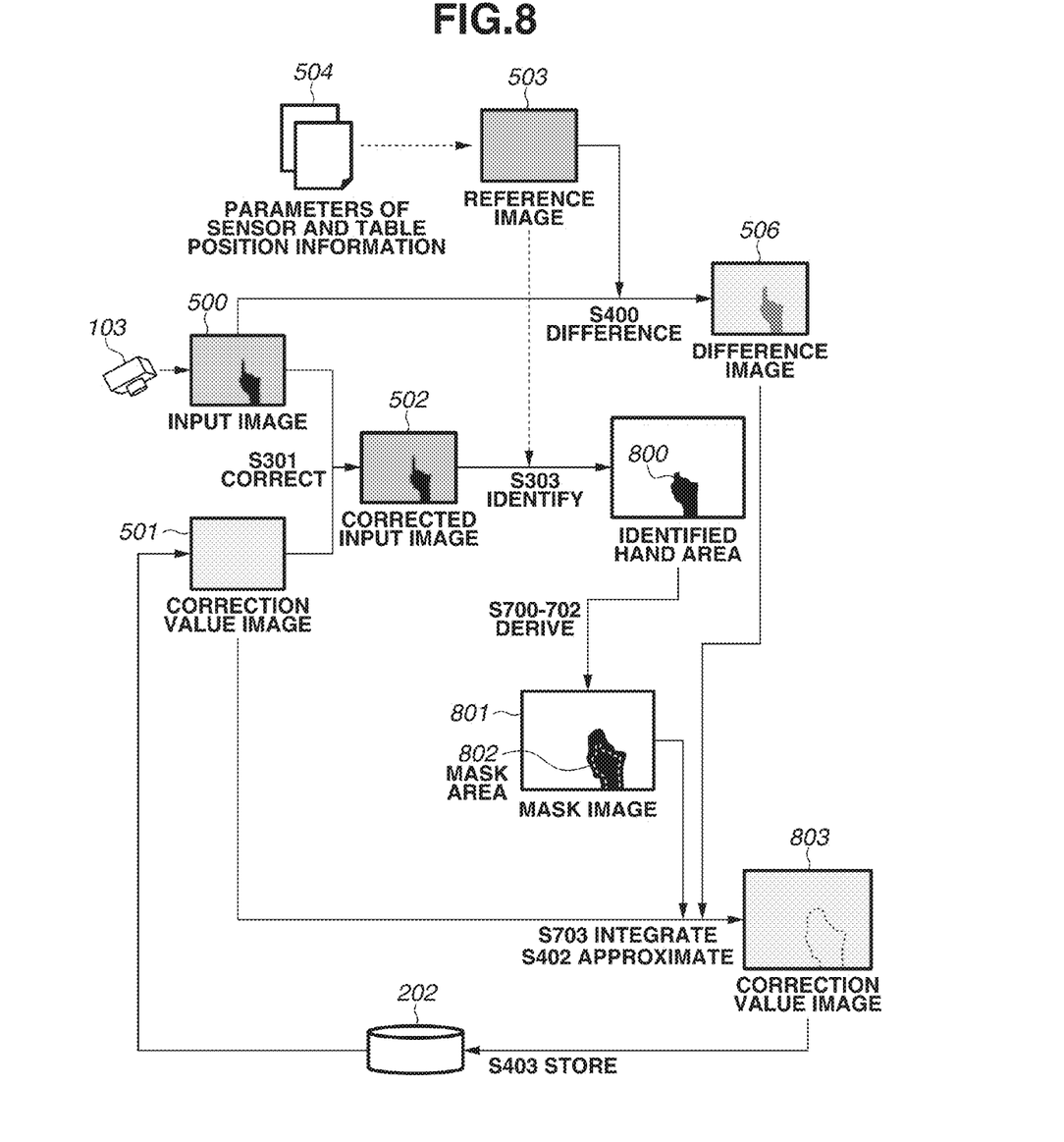
FIG. 8 illustrates an example of a process of the derivation processing of the correction value image according to the variation.

A processing procedure of the touch input recognition processing according to the variation is similar to the flowchart of the first exemplary embodiment illustrated in FIG. 3. Here, derivation processing of a correction value image (corresponding to step S304) of the variation different from that of the first embodiment is described with reference to a flowchart of FIG. 7. Steps of processing similar to those of the flow chart of the first exemplary embodiment illustrated in FIG. 4 are denoted with the same numbers and the detailed description thereof is not provided. Here, points that are different from the first exemplary embodiment are described. In the following description, FIG. 8 is appropriately referred. FIG. 8 illustrates a whole process of deriving a correction value image in the variation. In FIG. 8, parts that are common with FIG. 5 are denoted with the same numbers.

In step S700, the mask deriving unit 600 derives a difference between pixel values of corresponding pixels of the corrected input image 502 and the reference image 503, for each pixel in a hand area 800. The difference derived in step S700 corresponds to magnitude of a distance from the target surface to an imaged surface of the corrected input image 502. In step S701, the mask deriving unit 600 determines a mask distance threshold value for each pixel in the hand area 800, based on the derived difference value. The mask distance threshold value is a threshold value of a distance defined in a two-dimensional image coordinate system defined in the input image 500. In the present variation, pixels outside the hand area 800 whose distances (pixel-to-pixel distances in the image coordinates) from a certain pixel in the hand area 800 are within the mask distance threshold values each determined for the pixels are considered as follows: possibility of inaccuracy is relatively high in the distance measurement values with respect to the target surface 101. When the distance measurement values with respect to the target surface 101 are inaccurately obtained, there may be a defect in the hand area 800. A defect in the hand area 800 is likely to occur when a portion of the hand is touching the target surface or approaching, even if not touching, the target surface. Therefore, in step S701, using difference values representing magnitude of a distance from the target surface to the imaged surface of the corrected input image 502 and predetermined threshold values, the mask deriving unit 600 identifies pixels that are considered that the imaged surface in the corrected input image 502 is close to the target surface in some extent although the pixels are in an area where a hand was imaged. In other words, it is considered that there is a higher possibility that a defect has occurred in the hand area 800 as the pixel has a smaller difference value (close to the target surface). Therefore, in step S701, the mask deriving unit 600 determines a larger value as a mask distance threshold value for a pixel having a smaller difference value.

In step S702, the mask deriving unit 600 derives a mask image 801. In the present variation, using a mask distance threshold value determined for each pixel in the hand area 800, the mask deriving unit 600 sets pixels whose distances from the pixel (a distance calculated in the image coordinates) are within the mask distance threshold value to be a portion of a mask area 802. The mask deriving unit 600 performs the same processing for all the pixels in the hand area 800, and sets pixels which are present at distances further than the mask distance threshold values from all the pixels and thus are not identified as a portion of the mask area 802 to be an unmasked area in the mask image 801. Since all the pixels in the hand area 800 are masked similarly to the first exemplary embodiment, target pixels of the processing for comparing their distances from each pixel in the hand area 800 with a mask distance threshold value thereof may be limited to pixels outside the area 800. In step S703, the correction value deriving unit 215 integrates a portion corresponding to an area (pixels) excluding the mask area 802 of the mask image 801 in the difference image into a new correction value image 803. Also in the present variation, overwriting pixel values of the correction value image 501 with pixel values of corresponding pixels in the difference image 506 is regarded as integration. The method of integration is however not limited to this, and weighted sum of the pixel values of the difference image 506 and the pixel values of the original correction value image 501, for example, enables suppression of extreme variation in correction values due to sudden noise.

As described above, according to the present variation, in the derivation processing of the correction value image, mistaken calculation of correction values near the boundary of the object area can be suppressed. In particular, when there is a defect in the identified hand area or when there is a lot of noise near the hand area, it is possible to suppress deterioration of correction accuracy by the correction value image.

In the first exemplary embodiment and its variation, the reference image and the correction value image are handled as images having pixels corresponding to respective pixels of the input image, that is, data in a two-dimensional matrix format has been described. However, as long as a correspondence relationship with a distance value reflected in each pixel of the input image is clearly defined, the reference distance or the correction value may be derived and held, for example, as a one-dimensional matrix rather than in an image form.

Embodiments of the present invention can be realized by providing a program realizing one or more functions of the above-described exemplary embodiment to a system or an apparatus through a network or a storage medium, and reading and executing the program by one or more processors in the system or the apparatus. In addition, embodiments of the present invention can be realized by a circuit realizing one or more of the functions (e.g., application-specific integrated circuit (ASIC)).

Embodiments of the present invention improve accuracy of processing for detecting an object that is present at an arbitrary position in a range image based on a range image having distance errors that may vary over time with tendencies different for each area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-183795, filed Sep. 21, 2016, which is hereby incorporated by reference herein in its entirety.

What is claimed is:

1. An information processing apparatus comprising:
one or more processors; and
memory storing executable instructions, which when executed by the one or more processors, cause the information processing apparatus to:
repeatedly obtain an input image that is obtained through imaging by an imaging unit oriented in a direction intersecting with a predetermined surface, the input image having pixels each representing a distance along the direction;

identify, in the obtained input image, an object area where an object that is present between the predetermined surface and the imaging unit is imaged; and correct a distance represented by each pixel in the input image repeatedly obtained, by using a correction value obtained based on a difference between a distance represented by a pixel of a portion of the input image excluding the object area and a reference distance between the imaging unit and the predetermined surface, wherein each time when the input image is obtained, the correcting corrects an input image to be obtained next time using the correction value obtained based on the difference between the distance represented by the pixel of the portion of the input image excluding the object area and the reference distance between the imaging unit and the predetermined surface.

2. The information processing apparatus according to claim 1, wherein the executable instructions, when executed by the one or more processors, further cause the information processing apparatus to:

derive a portion of the corrected input image as an input position, the portion corresponding to the object area; and recognize an instruction input to the information processing apparatus, based on variation in a distance between the input position obtained based on the input image repeatedly obtained and the predetermined surface.

3. The information processing apparatus according to claim 2, wherein the executable instructions, when executed by the one or more processors, cause the information processing apparatus to:

set, as the input position, a position satisfying a predetermined condition in the portion corresponding to the object area in the corrected input image and derive a three-dimensional position in the object area based on coordinates of the input position and a distance represented by a pixel corresponding to the coordinates.

4. The information processing apparatus according to claim 2, wherein the executable instructions, when executed by the one or more processors, cause the information processing apparatus to:

when an object that is present between the predetermined surface and the imaging unit is a hand of an operator, derive, as the input position, a position corresponding to a fingertip of the hand in the identified area.

5. The information processing apparatus according to claim 2, wherein the executable instructions, when executed by the one or more processors, cause the information processing apparatus to:

recognize, as a touch input, a transition from a state where a distance between the input position and the predetermined surface is larger than a predetermined distance to a state where the distance is smaller than the predetermined distance.

6. The information processing apparatus according to claim 1, wherein the imaging unit is a range image sensor, and wherein the executable instructions, when executed by the one or more processors, cause the information processing apparatus to:

obtain a range image captured by the range image sensor as the input image.

7. The information processing apparatus according to claim 1, wherein the imaging unit is a visible light sensor, and wherein the executable instructions, when executed by the one or more processors, cause the information processing apparatus to:

obtain a visible light image captured by the visible light sensor as the input image.

8. The information processing apparatus according to claim 1, wherein the imaging unit is an infrared light sensor, and wherein the executable instructions, when executed by the one or more processors, cause the information processing apparatus to:

obtain an infrared image captured by the infrared light sensor as the input image.

9. The information processing apparatus according to claim 1, wherein the executable instructions, when executed by the one or more processors, further cause the information processing apparatus to:

obtain a reference image having pixels each representing the reference distance between the imaging unit and the predetermined surface, wherein the correcting corrects the distance represented by each pixel in the input image repeatedly obtained, using the correction value obtained based on the difference between the distance represented by the pixel of the portion of the input image excluding the object area and a distance represented by a pixel of the reference image excluding a portion corresponding to the object area.

10. The information processing apparatus according to claim 9, wherein the executable instructions, when executed by the one or more processors, further cause the information processing apparatus to:

derive a correction value image that has pixels each holding a correction value for correcting the distance held by each pixel of the input image, using a difference value between the distance represented by each pixel of the portion of the input image excluding the object area and the distance represented by each pixel of the reference image excluding the portion corresponding to the object area, wherein the correcting corrects the input image by adding a value held by each pixel of the correction value image to the value held by a corresponding pixel of the input image repeatedly obtained.

11. The information processing apparatus according to claim 10, wherein the executable instructions, when executed by the one or more processors, cause the information processing apparatus to:

set the difference value calculated for each pixel of the input image and the reference image excluding the portion corresponding to the object area as the correction value to be held by a corresponding pixel of the correction value image.

12. The information processing apparatus according to claim 10, wherein the executable instructions, when executed by the one or more processors, cause the information processing apparatus to:

derive the correction value image each time when the obtaining obtains the input image, and set a weighted sum of the difference value calculated for each pixel of the last obtained input image and the reference image excluding the portion corresponding to the object area and the correction value held by the corresponding pixel of the correction image having been already derived as a new correction value to be held by the pixel of the correction value image.

13. The information processing apparatus according to claim 10, wherein the executable instructions, when executed by the one or more processors, cause the information processing apparatus to:
derive the correction value image that has pixels each holding a value approximated to a flat surface or a curved surface, based on the difference value calculated for each pixel of the input image and the reference image excluding the portion corresponding to the object area.

14. The information processing apparatus according to claim 10, wherein the executable instructions, when executed by the one or more processors, cause the information processing apparatus to:
determine a value to be held as a pixel value of each pixel of the correction value image, based on the difference value calculated for each pixel of the input image and the reference image excluding the portion corresponding to the object area, and determine a value to be held as a pixel value of each pixel included in the object area in the correction value image by interpolating the value held by a pixel near the object area.

15. The information processing apparatus according to claim 10, wherein the executable instructions, when executed by the one or more processors, cause the information processing apparatus to:
derive the correction value image using the difference value calculated for each pixel of the input image and the reference image excluding the portion corresponding to the object area and corresponding to pixels each having a pixel-to-pixel distance from the object area within a threshold value.

16. The information processing apparatus according to claim 15, wherein the executable instructions, when executed by the one or more processors, cause the information processing apparatus to:
identify the pixels each having a pixel-to-pixel distance from the object area within the threshold value, based on the threshold that is larger when the distance between the object area and the predetermined surface is smaller.

17. A method for controlling an image processing apparatus, the method comprising:
repeatedly obtaining an input image that is obtained through imaging by an imaging unit oriented in a direction intersecting with a predetermined surface, the input image having pixels each representing a distance along the direction;
identifying, in the obtained input image, an object area where an object that is present between the predetermined surface and the imaging unit is imaged; and
correcting a distance represented by each pixel in the input image repeatedly obtained, by using a correction value obtained based on a difference between a distance represented by a pixel of a portion of the input image excluding the object area and a reference distance between the imaging unit and the predetermined surface,
wherein each time when the input image is obtained, the correcting corrects an input image to be obtained next time using the correction value obtained based on the difference between the distance represented by the pixel of the portion of the input image excluding the object area and the reference distance between the imaging unit and the predetermined surface.

18. A non-transitory computer-readable storage medium storing a computer-executable program for causing a computer to perform the method according to claim 17.

* * * * *